United States Patent [19]

Therriault et al.

[11] Patent Number: 5,032,637

[45] Date of Patent: Jul. 16, 1991

[54] WATER-INACTIVATABLE PRESSURE SENSITIVE ADHESIVE

[75] Inventors: Donald J. Therriault; Jane E. Workinger, both of York, Pa.

[73] Assignee: Adhesives Research Inc., Glen Rock, Pa.

[21] Appl. No.: 493,460

[22] Filed: Mar. 14, 1990

[51] Int. Cl.$^5$ ............................................. C08K 5/10
[52] U.S. Cl. .................................. 524/375; 523/111; 526/931
[58] Field of Search .................... 524/375; 523/111

[56] References Cited

U.S. PATENT DOCUMENTS

| | | |
|---|---|---|
| 3,339,546 | 9/1967 | Chen . |
| 3,645,835 | 2/1972 | Hodgson . |
| 4,147,831 | 4/1979 | Balinth . |
| 4,350,785 | 9/1982 | Habib . |
| 4,359,047 | 11/1982 | Potaczek ............................ 523/111 |
| 4,452,845 | 6/1984 | Lloyd et al. . |
| 4,485,809 | 12/1984 | Dellas . |
| 4,505,976 | 3/1985 | Doehnert et al. . |
| 4,551,490 | 11/1985 | Doyle et al. . |
| 4,561,435 | 12/1985 | McKnight et al. . |
| 4,585,797 | 4/1986 | Cioca . |
| 4,650,817 | 3/1987 | Allen, Jr. et al. . |

FOREIGN PATENT DOCUMENTS 941276 11/1963 European Pat. Off. .

*Primary Examiner*—Joseph L. Schofer
*Assistant Examiner*—Jeffrey T. Smith

[57] ABSTRACT

A novel polymeric pressure-sensitive adhesive formulation is provided comprised of a hydrophilic base polymer compounded with at least one water-soluble tackifying component. Upon contact of the pressure-sensitive adhesive with excess amounts of water, the water-soluble tackifying component is caused to separate from the base polymer, thus decreasing the ability of the base polymer to function as a pressure-sensitive adhesive. The adhesive may subsequently be easily removed from any substrate to which it has been applied.

14 Claims, 1 Drawing Sheet

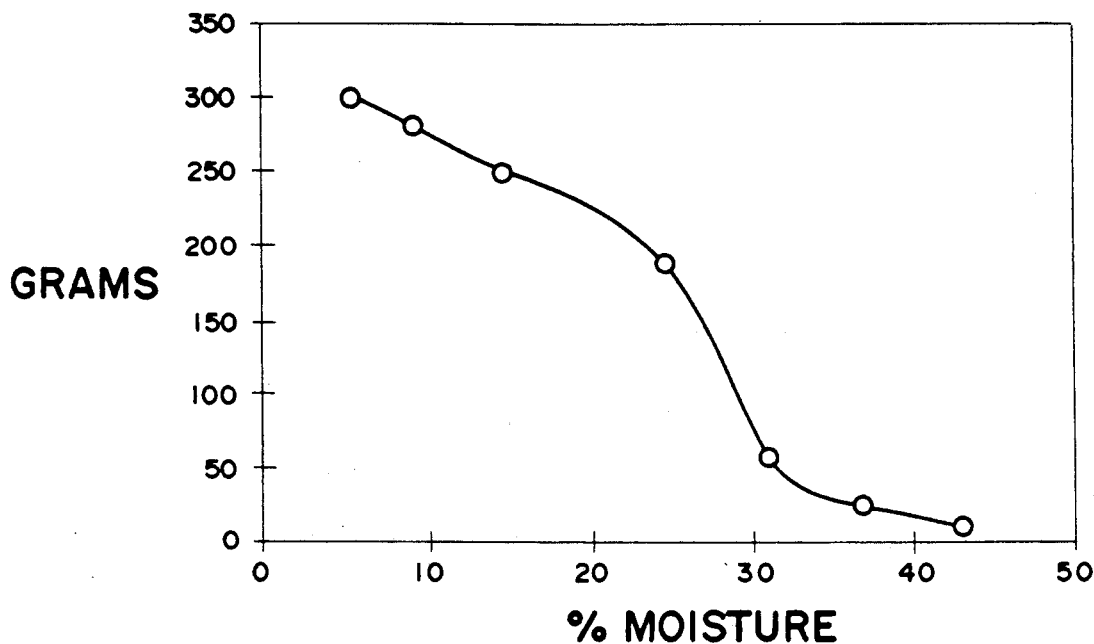
FIG. I
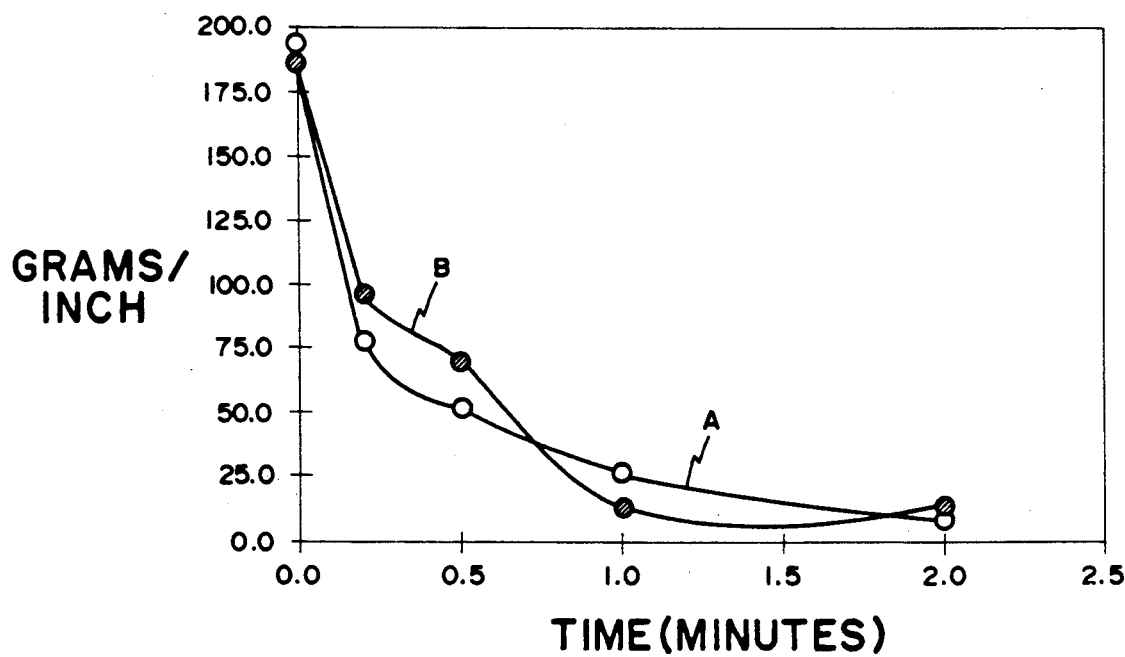
FIG. 2

WATER-INACTIVATABLE PRESSURE SENSITIVE ADHESIVE

BACKGROUND OF THE PRESENT INVENTION

The present invention is directed to water-inactivatable pressure-sensitive adhesives.

It is generally recognized that liquids are effective in reducing the adhesion to skin of pressure-sensitive adhesives, especially in the form as employed in adhesive medical devices. Liquids manifest their effect in several ways such as (1) interaction with the adhesive mass so as to alter the viscoelastic properties of the adhesive resulting in adhesive and/or cohesive failure, or (2) by disrupting the skin/adhesive contact interface. Rarely, although occasionally, the liquid acts upon the interface between the adhesive and any backing support employed. The extent and type of liquid interaction determines the ultimate performance of the adhesive product.

Those liquids which normally affect the performance of pressure-sensitive adhesive devices include body exudations, moisture from normal respiration of the skin, and externally-applied liquids such as water.

Coping with the effect of such liquids has been a primary concern of pressure sensitive adhesive suppliers. In general, it is recommended that an application site (such as the skin) be prepared by cleaning and drying immediately prior to application of the adhesive. For most short duration applications, such preparation is quite effective. However, in many situations, the adhesive device is required to remain adhesively secured to the skin for an extended period of time.

To ensure adequate functionality of the adhesive, suppliers have focused upon two avenues of approach. First, hydrophobic adhesives are employed which are substantially incompatible with those liquids with which they will come into contact. Such adhesives are also designed to be fairly aggressive by nature in terms of the degree of adhesion to the skin. Although effective in anchoring the medical device to the skin, the disruption of skin integrity resulting from attempts to remove the device from contact with the skin can be quite painful and/or irritating to the patient. This is particularly true in those areas where repeated applications to the skin are made, or where the skin is fragile. Any disruption to the integrity of the skin which results can be a significant disadvantage in terms of potential infection, as the protective effect of the skin is compromised.

By way of a second approach, liquid is removed from the skin/adhesive interface. This is accomplished by one of two methods. First, the adhesive device is designed so as to provide a water vapor transmission rate through the device which exceeds the normal respiration rate of the skin. This also assists in reducing masceration of the skin commonly experienced with adhesive medical devices. Such adhesive systems are disclosed in U.S. Pat. Nos. 3,645,835; 4,485,809; 4,452,845; and 4,561,435.

Secondly, a "hydroactive" adhesive composition is employed which is water absorbent. This tends to reduce the moisture content at the skin/adhesive interface, while also reducing the frequency of interfacial failure of the adhesive device.

Unfortunately, if the degree of moisture absorbance is excessive, cohesive failure of the adhesive can result. Tacky or sticky adhesive residue will possibly remain on the skin upon removal of the device, which must then be removed from the skin. Examples of such adhesives are disclosed in U.S. Pat. Nos. 3,339,546; 4,147,831; 4,350,785; 4,393,080; 4,505,976; 4,551,490; and 4,650,817.

It is thus desirable to provide a pressure-sensitive adhesive composition which exhibits an aggressive adhesive ability but which may be removed with ease from a substrate to which the adhesive is applied while minimizing the amount of residue which remains.

OBJECTS AND SUMMARY OF THE INVENTION

It is thus one object of the present invention to provide a pressure-sensitive adhesive composition which may be easily inactivated so as to enhance the ease of removal of the adhesive from a substrate.

It is also an object of the present invention to provide means to change a permanent pressure-sensitive adhesive to a removable pressure-sensitive adhesive.

It is also an object of the present invention to provide a pressure-sensitive adhesive which exhibits satisfactory adhesion properties, while also having the capability of retaining such properties in the presence of minor amounts of moisture.

It is also an object of the present invention to provide a pressure-sensitive adhesive composition which exhibits aggressive adhesive properties but which may be easily removed from a substrate to which it is applied upon application of excess amounts of water thereto.

In accordance with the present invention, there is thus provided a water-inactivatable pressure-sensitive adhesive comprised of a hydrophilic base polymer in admixture with a water-soluble tackifying agent, said base polymer comprising at least one polymer of an alkyl vinyl ether:maleic acid ester in admixture with at least one polyvinyl alkyl ether.

In accordance with yet another object of the present invention, there is provided, in combination, (1) a water-inactivatable pressure-sensitive adhesive comprised of a hydrophilic base polymer in admixture with a water-soluble tackifying agent, said base polymer comprising at least one polymer of an alkyl vinyl ether:maleic acid ester in admixture with at least one polyvinyl alkyl ether, and (2) a water-absorbing backing support material to which said adhesive is applied.

BRIEF DESCRIPTION OF THE DRAWINGS

FIG. 1 depicts the relationship between the tack exhibited by the pressure-sensitive adhesive of the present invention and the amount of moisture absorbed by the adhesive.

FIG. 2 depicts the relationship between peel adhesion exhibited by the pressure-sensitive adhesive of the present invention versus time upon saturation with moisture.

DETAILED DESCRIPTION OF THE INVENTION

The present invention pertains to a water-inactivatable pressure-sensitive adhesive comprised of a hydrophilic base polymer in admixture with a water-soluble tackifying agent. By way of definition, the pressure-sensitive adhesive is, under normal conditions, tacky, viscoelastic and cohesive in its dry state.

Desirably, upon contact with excess amounts of water, the adhesive composition of the present invention undergoes a radical alteration of its viscoelastic properties by means of a controlled phase separation of its constituent components, which renders the composition significantly less tacky. Such alteration involves the migration of the water-soluble tackifier to the adhesive/substrate interface, with the result that the adhesive can be readily removed from contact with the substrate with much less effort than would normally be required.

The base polymer component employed in the pressure-sensitive adhesive composition of the present invention comprises at least one polymer of an alkyl vinyl ether:maleic acid ester in admixture with at least one polyvinyl alkyl ether. Such compounds have been found to be particularly amenable for use in conjunction with the composition of the present invention, and especially in a pressure-sensitive adhesive used in or in conjunction with medical devices to be applied to the skin of a person.

The alkyl vinyl ether:maleic acid ester polymers of the present invention can be represented by the formula:

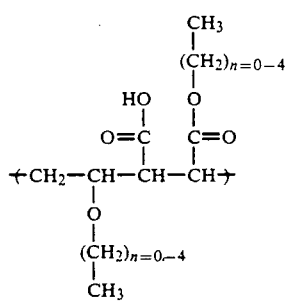

Exemplary base polymer components include but are not limited to alkyl vinyl ether:maleic acid ester copolymers such as ethyl vinyl ether:maleic acid monomethyl and monoethyl ester copolymers.

By way of further advantage, the polyvinyl alkyl ether component (such as polyvinyl methyl ethers) exhibits elastomeric properties as well as enhancing the absorbent properties of the base polymer. Such base polymer materials are non-toxic and enable a pressure-sensitive adhesive to be formed which is conformable and adherable to a variety of substrates such as a person's skin under a range of conditions.

The base polymer component of the adhesives of the present invention comprises from about 40 to about 95 weight percent of at least one polymer of an alkyl vinyl ether:maleic acid ester and from about 5 to about 60 percent by weight of at least one polyvinyl alkyl ether, and preferably from about 20 to about 60 percent by weight of the polyvinyl alkyl ether.

The base polymer is advantageously substantially water-insoluble under those conditions normally encountered during use of the adhesive (i.e., under ambient conditions).

The tackifying component of the adhesive compound of the present invention comprises a water-soluble compound of relatively low molecular weight which, when admixed with the base polymer component, serves to tackify the base polymer, with a pressure-sensitive adhesive composition resulting. The tackifier, when used in a pressure-sensitive adhesive to be applied to the skin of a person, is desirably medically non-irritating. The tackifier must also be compatible with the base polymer to permit the tackifier to be homogeneously dispersed therein.

Tackifying components suitable for use in the present invention include, but are not limited to, ethoxylated alkyl phenols and similar amphipathic compounds (i.e., compounds having both hydrophilic and lipophile regions). Linear glycols such as glycerol, dipropylene glycol and diethylene glycol are also suitable for use in the present invention as the tackifying component.

Preferably, the molecular weight of the tackifying component is in the range of from about 50 to 20,000.

Exemplary tackifier components are available from GAF Corporation under the trade name Igepal (a class of various ethoxylated alkyl phenols). Mixtures thereof with polyethylene glycols are also suitable for use in the present invention.

Preferably, the tackifier component and base polymer component are combined in weight ratios ranging from about 0.8:1 to about 3.0:1, and more preferably ranging from about 1:1 to about 2:1, respectively.

Once formed, the generally aggressive adhesive properties of the pressure-sensitive adhesive of the present invention may be modified and/or controlled as follows.

Upon contact of the adhesive with an excess or saturating amount of water, water is drawn into the adhesive due to the hydrophilic character of the base polymer. Catastrophic phase separation of the tackifier from the base polymer is then observed as evidenced by a gross change in the viscoelastic properties of the adhesive. The adhesive is also weakened as water begins to act as a plasticizer. As the water-soluble tackifier component migrates to the substrate/adhesive interface, the original homogeneous nature of the pressure-sensitive adhesive composition is destroyed and the adhesive eventually becomes relatively tackless in comparison to the tack originally exhibited by the adhesive. As liberated tackifier migrates to the adhesive/substrate interface, the dislodgement of the adhesive from the substrate rapidly occurs. Such a sequence of events has been observed to occur relatively rapidly (such as over a period of time of two minutes or so).

The tack exhibited by the water-soluble tackifier alone (upon migration to the interface between the composition and the substrate) is significantly less than that originally exhibited by the pressure-sensitive adhesive. Such reduced tack, together with the phase separation of the original adhesive composition, enables the composition to be easily removed from the substrate. The net effect is that the adhesion exhibited by the saturated adhesive is, after several minutes of being saturated with moisture, about 75-80 percent less than the adhesion originally exhibited. Once the adhesive is removed, only minor amounts of water-soluble tackifier remain on the substrate, which can be easily removed.

Additional conventional pressure-sensitive adhesive modifiers may also be present such as extenders, stabilizers, antioxidants, pigments and fillers. Such modifiers are employed in amounts generally deemed to be conventional to those skilled in the art.

The water-inactivatable pressure-sensitive adhesive composition of the present invention is normally employed in conjunction with a porous supporting backing material having the ability to (1) absorb excess or saturating amounts of moisture and (2) provide structural integrity for the adhesive. Such water-absorbent backing materials include but are not limited to woven and non-woven fabrics comprised of natural or synthetic materials. For instance, materials such as cellulose acetate tricots can be employed with success. Additional types of backing materials which can be employed include knitted fabrics, such as knitted nylon, elastic fabrics or bandages, etc.

The major requirement with regard to the type of absorbent backing material employed is that the material have the capability to absorb excess or saturating amounts of moisture, with such amounts being on the order of about 25 percent or more based on the weight of the adhesive.

It is also desirable for the backing support material to be one to which the pressure-sensitive adhesive can be well bonded and/or anchored. Such bonding or anchoring ensures that, upon contact of excess amounts of moisture with the adhesive, any delamination or phase separation which occurs will occur at the interface between the adhesive layer and the substrate, instead of between the adhesive layer and the backing material.

The pressure-sensitive adhesive can be coated upon the backing material by conventional means and the adhesive dried to yield a tacky pressure-sensitive adhesive supported on the material.

It is further advantageous for the pressure-sensitive adhesive composition of the present invention to exhibit significant water vapor transmission rates to enable the adhesive to satisfactorily function in the presence of moisture in those amounts normally encountered under ambient conditions of use (such as while in contact with the skin of a person).

It has been determined that the adhesive compositions of the present invention exhibit water vapor transmission rates on the order of at least 2500 g/M$^2$/day. Such a water vapor transmission rate is of such magnitude that the adhesive of the present invention can employed without much regard for the thickness of the adhesive layer. That is, the adhesive composition of the present invention can be employed on a backing material in a layer having a thickness on the order of 0.5 to 3.5 mils without fear of significantly inhibiting the water vapor transmission rate of the adhesive.

It has also been determined that the pressure-sensitive adhesive compositions of the present invention can absorb significant amounts of moisture without adversely affecting tack properties. For example, it has been determined that (as demonstrated in the Examples) up to about 20 to 25 percent by weight of moisture (based on the weight of the adhesive layer) can be absorbed without catastrophic loss of probe tack, with absorbed amounts in excess of about 25 percent by weight of moisture beginning to adversely affect probe tack.

The absorption of moisture in amounts in excess of about 30 percent by weight will generally result in catastrophic loss of tack, resulting in ease of removal of the adhesive layer from the substrate in a manner consistent with the objects of the present invention. As a result, the adhesive composition is particularly amenable for use in connection with medical devices which are adhesively-applied in the neonatal and geriatric areas. Such adhesives can be employed, for example, in adhesive tapes, bandages, surgical drapes, etc.

The invention is described further by the following Examples, which are intended to be merely exemplary of the present invention and not in any way limiting.

EXAMPLE 1

An exemplary base polymer for use in the present invention is produced as follows. An equimolar copolymer of ethyl vinyl ether:maleic anhydride is reacted with a suitable alcohol such a methanol to yield, via nucleophilic addition to the anhydride, the corresponding monoester and acid moieties of the formula, repeating units of which form the following exemplary alkyl vinyl ether:maleic acid ester polymer:

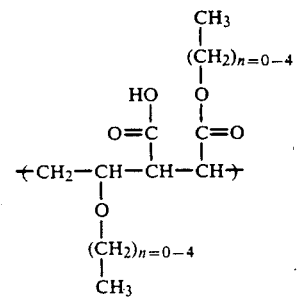

With regard to the specific manner of preparation of the above monoester moiety, a 20 percent solids solution of the ethyl vinyl ether:maleic anhydride in alcohol is prepared. Upon mixing, a white dispersion is formed. As time passes, the dispersion becomes progressively more viscous due to the alcohol solubility exhibited by the monoester. As the reaction proceeds, the dispersion becomes clear. The reaction takes approximately 240 hours to run to completion at room temperature.

Methyl, ethyl, and propyl monoesters can be produced and used with success in the present invention.

EXAMPLE 2

20 grams of ethyl vinyl ether:maleic acid monomethyl ester are dissolved in 80 grams of methanol until a uniform solution is achieved. 20 grams of polyvinyl methyl ether are added to 20 grams of toluene and dissolved. The two solutions are then mixed together to obtain a uniform mixture. To the resulting mixture is added 54 grams of GAF Igepal CO 630 tackifying agent and mixed until clear.

The resulting solution is cast onto a 40#/ream siliconized release liner and dried at 200° F. for 10–15 minutes to achieve a final coat weight of 2.0 oz./yd$^2$. The dried pressure-sensitive adhesive is then laminated to DuPont Sontara Style 8021 at 100 psi and 20 fpm at ambient room temperature to yield a pressure-sensitive adhesive having a supporting backing material.

EXAMPLE 3

The pressure-sensitive adhesive formulation of Example 2 is prepared, with the exception that the ethyl vinyl ether:maleic acid monomethyl ester is successfully replaced with ethyl vinyl ether:maleic acid monoethyl ester to yield a pressure-sensitive adhesive having a supporting backing material.

EXAMPLE 4

The pressure-sensitive adhesive formulation of Example 2 is prepared, with the exception that GAF Igepal CO 630 is successfully replaced with GAF Igepal CO 850 to yield a pressure-sensitive adhesive having a supporting backing material.

EXAMPLE 5

The pressure-sensitive adhesive formulation of Example 2 is prepared, with the exception that the backing support material which is employed is Guilford Mills Cellulose Acetate Tricot instead of DuPont Sontara.

EXAMPLE 6

To test the moisture capacity and the effect thereof on the adhesive properties of the pressure-sensitive adhesives of the present invention, adhesive samples made in accordance with the present invention were cast onto 2 mil thick PET film, placed on Payne cups loaded with water, and conditioned at various temperatures. At prescribed time intervals, samples were removed and tested for Probe Tack (tack measured as grams force) and moisture content (% moisture based on adhesive weight). The results are depicted in FIG. 1.

From the Figure, it is apparent that the adhesive of the present invention can absorb up to about 20 to 25% of its own weight without catastrophic loss of Probe Tack. At absorption values of between 25 and 30%, a change in the viscoelastic properties of the adhesive can be observed. Accordingly, an amount of water in excess of about 30% based on the weight of the adhesive is found to reduce the Probe Tack to substantially negligible values, thus inactivating the adhesive.

EXAMPLE 7

A pressure-sensitive adhesive prepared according to the present invention is cast at a dry coating weight of 2.0-2.2 oz/yd$^2$ onto a Sontara 8021 polyester nonwoven backing material. The nonwoven material has a weight of 2.4 oz/yd$^2$, and a moisture capacity of 450%.

Samples of adhesive were then tested for adherence to stainless steel panels at a peel angle of 90 degrees and a rate of two inches/minute (with the force required to peel the strip from the panel being measured).

To conduct the test, multiple samples were employed approximately one inch in width and approximately 10 inches long.

As the test began, a base line adhesion value was obtained by conducting a dry peel adhesion test over approximately 1-1.5 inches of the sample.

Once this value was established, the samples were saturated with water with a sponge. The peel adhesion with respect to time was monitored to determine the % loss of adhesion (in comparison to the baseline adhesion) and the time required to achieve the loss (decay time).

Line A on FIG. 2 depicts average values for 3-4 samples for an adhesive formulation comprised of Igepal:base resin in a ratio of 1.5:1, with Line B on FIG. 2 depicting average values for 3-4 samples for an adhesive formulation comprised of Igepal:base resin in a ratio of 1.25:1.

From FIG. 2 it can be seen that the % adhesion loss is typically about 60% within the first 30 seconds of saturation. As time progresses, the rate of decay slows. By about two minutes, the % loss of adhesion reaches about 90-95%.

What is claimed is:

1. A water-inactivatable pressure sensitive adhesive comprised of a hydrophilic base polymer component in admixture with a water-soluble tackifying agent for said base polymer, said base polymer component comprising at least one polymer of an alkyl vinyl ether:maleic acid ester in admixture with at least one polyvinyl alkyl ether, said base polymer component comprising from about 40 to about 95 percent of said alkyl vinyl ether:maleic acid ester polymer and from about 5 to about 60 weight percent of a polyvinyl alkyl ether.

2. The pressure-sensitive adhesive of claim 1 wherein said tackifying agent is selected from the group consisting of ethoxylated alkyl phenols, glycerol, diproplyene glycol and diethylene glycol.

3. The pressure-sensitive adhesive of claim 1 wherein said tackifying agent has a molecular weight in the range of from about 50 to 20,000.

4. The pressure-sensitive adhesive of claim 1 wherein said tackifier and said base polymer component are present in a weight ratio of from about 0.8:1 to about 3.0:1, respectively.

5. The pressure-sensitive adhesive of claim 4 wherein said tackifier and said base polymer component are present in a weight ratio of from about 1:1 to about 2:1, respectively.

6. The pressure-sensitive adhesive of claim 1 wherein said alkyl vinyl ether:maleic acid ester polymer is comprised of repeating units of the formula:

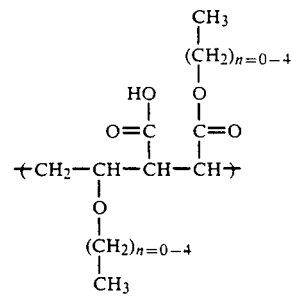

7. The pressure-sensitive adhesive of claim 1 wherein said admixture comprises from about 20 to about 60 percent by weight of a polyvinyl alkyl ether.

8. In combination, (1) a water-inactivatable pressure sensitive adhesive comprised of a hydrophilic base polymer component in admixture with a water-soluble tackifying agent for said base polymer, said base polymer component comprising at least one polymer of an alkyl vinyl ether:maleic acid ester in admixture with at least one polyvinyl alkyl ether, said base polymer component comprising from about 40 to about 95 percent of said alkyl vinyl ether:maleic acid ester polymer and from about 5 to about 60 weight percent of a polyvinyl alkyl ether, and (2) a water-absorbing backing support material to which said adhesive is applied.

9. The combination of claim 8, wherein said tackifying agent is selected from the group consisting of ethoxylated alkyl phenols, glycerol, diproplyene glycol and diethylene glycol.

10. The combination of claim 8, wherein said tackifying agent has a molecular weight in the range of from about 50 to 20,000.

11. The combination of claim 8, wherein said tackifier and said base polymer component are present in a weight ratio of from about 0.8:1 to about 3.0:1, respectively.

12. The combination of claim 11, wherein said tackifier and said base polymer component are present in a weight ratio of from about 1:1 to about 2:1, respectively.

13. The combination of claim 8, wherein said polymer of said alkyl vinyl ether:maleic acid ester is comprised of repeating units of the formula:

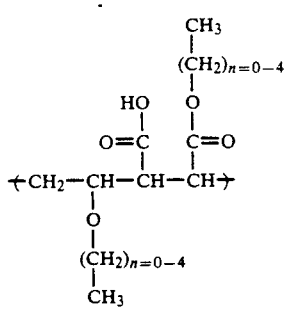
14. The combination of claim 8, wherein said admixture comprises from about 20 to about 60 percent by weight of polyvinyl alkyl ether.
* * * * *
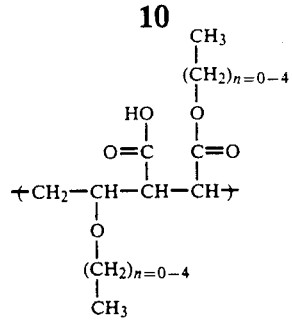
14. The combination of claim 8, wherein said admixture comprises from about 20 to about 60 percent by weight of polyvinyl alkyl ether.
* * * * *